Figure 1:
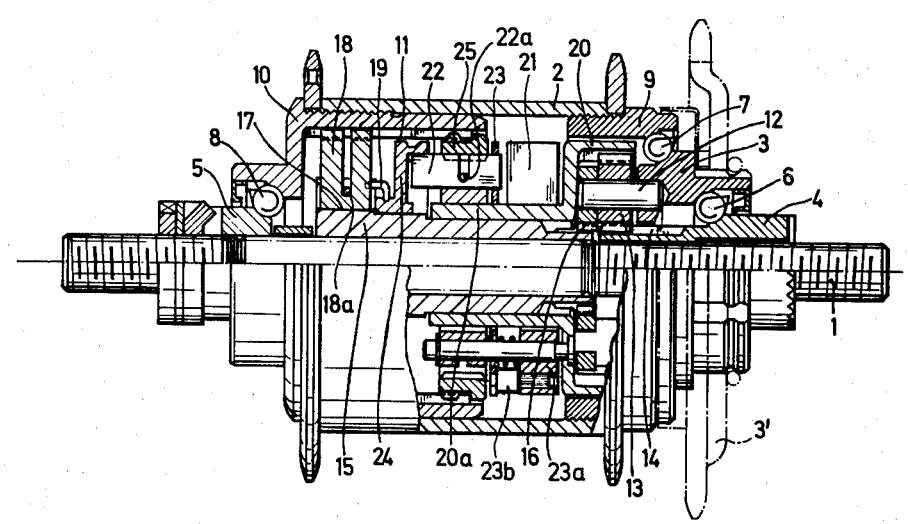

United States Patent [19]

Schwerdhöfer

[11] 4,229,997
[45] Oct. 28, 1980

[54] MULTIPLE SPEED HUB FOR A BICYCLE WITH CENTRIFUGALLY CONTROLLED SPEED CHANGE AND OVERRIDE MECHANISM ACTUATED BY BACK PEDALING

[75] Inventor: Hans-Joachim Schwerdhöfer, Schweinfurt am Main, Fed. Rep. of Germany

[73] Assignee: Fichtel & Sachs A.G., Schweinfurt am Main, Fed. Rep. of Germany

[21] Appl. No.: 820,782

[22] Filed: Aug. 1, 1977

[30] Foreign Application Priority Data

Aug. 6, 1976 [DE] Fed. Rep. of Germany ....... 2635442

[51] Int. Cl.³ .......................... F16H 3/74; F16H 5/52
[52] U.S. Cl. .................................. 74/752 E; 74/810; 192/103 B
[58] Field of Search ................ 74/752 E, 756 B, 810; 192/6 A, 103 B, 105 CD

[56] References Cited

U.S. PATENT DOCUMENTS

| 3,438,283 | 4/1969 | Schwerdhöfer | 74/752 E |
| 3,546,971 | 12/1970 | Schwerdhöfer | 74/752 E |
| 3,600,974 | 8/1971 | Schwerdhöfer | 74/752 E |
| 3,603,178 | 9/1971 | Schwerdhöfer | 74/752 E |
| 3,648,809 | 3/1972 | Schwerdhöfer | 192/6 A |
| 3,701,292 | 10/1972 | Schulz | 74/752 E |

*Primary Examiner*—Samuel Scott
*Assistant Examiner*—G. Anderson
*Attorney, Agent, or Firm*—Toren, McGeady and Stanger

[57] ABSTRACT

Two transmission members of a planetary gear transmission in a hub of a driven vehicle wheel are driven simultaneously at different speeds in a forward or backward direction. Driven forward movement of the slower transmission member is transmitted to the hub shell by an overrunning clutch. A second clutch connects the other transmission member to the hub shell when operated by a centrifugal governor at a certain rotary speed. A control device responds to backward rotation of the transmission members, as by back-pedaling, for overriding the governor and for operating the second clutch independently of the rotary speed.

18 Claims, 16 Drawing Figures

MULTIPLE SPEED HUB FOR A BICYCLE WITH CENTRIFUGALLY CONTROLLED SPEED CHANGE AND OVERRIDE MECHANISM ACTUATED BY BACK PEDALING

This invention relates to multiple-speed hubs for driven vehicle wheels and will be discussed hereinbelow with reference to a dual-speed hub for the rear wheel of a bicycle which may be switched automatically by a centrifugal governor between its two speeds in response to the rotary speed of the wheel, but is also equipped with an operator-controlled overriding device which permits speed change independently of the wheel speed.

A dual-speed hub of the above type has been disclosed in my earlier U.S. Pat. No. 3,592,081. Its overriding device is operated manually by means of a lever mounted on the handle bars of the bicycle. The Bowden cable needed for connecting the hub to the operating lever requires very careful installation and adjustment for proper functioning of the known overriding device, and many of the advantages of centrifugally controlled speed change are lost if a hand must be used for operating the overriding device.

It is a primary object of this invention to provide a multiple-speed hub of the type described which may be operated without hands and whose overriding device does not require a motion transmitting train from another part of the vehicle to the multiple-speed hub.

With this object and others in view, the invention replaces the manual overriding device of the earlier patent by a device which is operated by briefly back-pedaling through a fraction of a revolution of the pedal assembly.

Other features, additional objects, and many of the attendant advantages of this invention will readily be appreciated as the same becomes better understood from the following description of preferred embodiments when considered in connection with the appended drawing in which:

FIG. 1 shows a multiple-speed hub of the invention for the rear wheel of a bicycle in rear elevation, and partly in section; and FIGS. 2 to 16 illustrate respective modifications of the hub of FIG. 1 by conventional symbols, only one symmetrical half of each hub being shown in section on the hub axis.

Referring initially to FIG. 1, there is shown a shaft 1 normally fixedly mounted in the rear wheel fork of a bicycle or like vehicle. The axial ends of the shaft 1 carry fixedly, but adjustably mounted inner bearing elements 4, 5 on which bearing balls 6, 8 roll in respective cages. A tubular driver 3 is rotatably mounted on the balls 6, and its radially outer circumference carries another set of bearing balls 7. The two axial ends of a hub shell 2 are equipped with fixed outer bearing elements 9, 10 respectively mounted on the bearing balls 7, 8.

A sprocket 3', shown in phantom view, is normally mounted on the driver 3 outside the hub shell 2 and is connected by a chain with the pedals of the bicycle in a manner not shown and conventional. The driver 3 constitutes the planet carrier of a planetary gear transmission in the hub shell 2. Planet shafts 12 are parallel to the axis of the shaft 1, hereinafter referred to as the hub axis, and are circumferentially distributed on the driver 3 about the hub axis. They carry respective planet gears 13 each of which meshes simultaneously with a sun gear 14, and with internal teeth of a ring gear 20.

Interengaged axial projections and recesses 16 permanently couple the driver 3 with a coaxial drive sleeve 15 rotatably supported by the shaft 1. A pawl carrier 17 carrying pawls 18 is secured against rotation on the axial end of the drive sleeve 15 remote from the driver 3. An annular pawl spring 18a received in a slot of each pawl 18 biases the pawls into engagement with axially elongated ratchet teeth 11 on a tubular portion of the outer bearing element 10 in the hub shell 2. During forward pedaling, the sprocket 3' turns the pawls 18, and the pawls may transmit torque to the hub shell 2 through the bearing element 10. When the hub shell 2 turns faster than the drive sleeve 15 or when the drive sleeve turns in the opposite direction during back-pedaling, the ratchet teeth 11 overtravel the pawls 18. The pawls 18 and teeth 11 thus constitute a first overrunning clutch.

A tubular hub portion 20a of the ring gear 20 is rotatably supported on the drive sleeve 15 and carries a centrifugal governor 21 which controls engagement of pawls 22 of a second clutch with internal ratchet teeth of a ring 25. Angular movement of the ring 25 on the hub shell 2 is limited or prevented by engagement of the afore-mentioned ratchet teeth 11 in recesses in the external circumference of the ring 25. The pawls 22 are pivotally mounted on the ring gear 20 and biased toward engagement with the ring 25 by a common pawl spring 22a. The pawl-and-ratchet clutch 22, 25 may be disengaged by the centrifugal governor 21 which includes a control disc 23 angularly movable about the hub axis.

The governor 21 further includes flyweights 23a pivotally mounted on the ring gear 20. Axial pins 23b extend from each flyweight 23a through the control disc 23 so that the disc 23 is moved angularly in response to pivoting movement of the weights 23a which are spring biased toward the hub axis. A more detailed description of an analogous contrifugal governor is found in U.S. Pat. No. 3,600,974 and centrifugal governors for use in other embodiments of the invention are known from U.S. Pat. No. 3,592,081.

The pawls 22 may further be held out of engagement with the ring 25 by means of a control element 24 having the shape of a shallow cup whose apertured bottom wall centrally receives the drive sleeve 15 and the shaft 1. The axial wall of the control element 24 carries an annular cam face which envelops portions of the pawls 22. Respective portions of the cam face differ in their spacing from the hub axis so as to permit or prevent engagement of the ring 25 by the pawls 22. A more detailed description of an analogous control element is found in U.S. Pat. No. 3,648,809.

The control element 24 is rotatably mounted on the drive sleeve 15 and is connected with the pawl carrier 17 by a wire spring 19 circumferentially secured to the pawl carrier and wound about a hub portion of the control element 24 in such a manner as to tighten during back-pedaling and the corresponding backward rotation of the drive sleeve 15. Abutment portions of the cam face in the control element 24 are engaged by the pawls 22 during forward pedaling so that the control element 24 normally turns with the pawls 22. During back-pedaling, the control element 24 is coupled to the drive sleeve 15 by the spring 19 while the pawls 22 turn with the faster ring gear 20 from one portion of the cam face in the control element 24 to another.

If the centrifugal governor 21 permitted engagement of the pawls 22 with the ring 25 and the rotation of the hub shell 2 at the relatively high speed of the ring gear 20, the pawls 22 may be retracted by brief back-pedaling to cause rotation of the hub shell 2 during subsequent forward pedaling at the end of the driver 3. The high speed condition may be restored, if the centrifugal governor 21 still permits, by another brief backward movement of the driver 3. Regardless of the position of the control element 24, the hub shell 2 runs at the slower speed of the driver 3 when the hub starts turning from a standstill.

The hub illustrated in FIG. 1 may be modified in many ways. If it is preferred that the operator may shift the hub into high speed regardless of the condition of the centrifugal governor 21, the control element 24 is replaced by a non-illustrated element having a convex cam face of circumferentially varying effective radius, and the pawls 22 circle the cam face, being held in engagement with the ring 25 according to the operator's wish by the control element 24 regardless of the rotary speed of the hub and the resulting radial position of the flyweights 23a.

The hub shown in FIG. 1 is not equipped with an internal brake and is intended for use with a manually braked wheel. However, the illustrated hub may be modified in an obvious manner to include a coaster brake.

Additional modifications of the centrifugally shifted dual-speed hub with pedal-operated override mechanism described above with reference to FIG. 1 are shown in a conventional manner in FIGS. 2 to 16. In each of these Figures, functionally equivalent parts are designated by identical reference numerals. Each of FIGS. 2 to 16 shows a stationary shaft 30 and a hub shell 31 coaxially rotatable on the shaft 30. A driver 32 is coaxially coupled to a drive sleeve 33 directly or indirectly in FIGS. 2–7 and 11–13. The driver 32 may itself constitute the planet carrier 34 of planetary gearing in the hub shell 31 or be coupled, directly or indirectly, to a separate planet carrier 34. The planet and sun gears are not specifically identified, but evident from the showing of shafts 30 and ring gears 35. A flyweight 36 controls engagement of a pawl 38 with ratchet teeth 39 on the hub shell 31 by means of a control disc 37. A control element 40 for the pawl 38 is actuated by back-pedaling, and its backward rotation with the pawl 38 is impeded by a friction spring 41. Another overrunning clutch independent from the flyweight 36 and the pedal-operated control element 40 includes a pawl 42 and a ratchet rim 43 on the hub shell 31.

Figure 2:
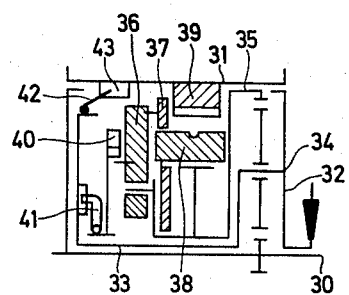

In the dual-speed hub shown in FIG. 2, torque is transmitted from the driver 32 to the hub shell 31 at the speed of the driver by the drive sleeve 33 which carries the pawls 42 of the first overrunning clutch also including a ratchet rim 43 on the hub shell 31. The friction spring 41 for braking the control element 40 is fastened to the pawl carrying part of the sleeve 33. The cam face of the element 40 envelops the flyweights of the centrifugal governor mounted on the ring gear 35. When the control element 40 is inactive, the flyweights 36 control the pawls 38 of a second clutch which may couple the ring gear 35 to the ratchet teeth 39 of the hub shell 31.

In the otherwise similar hub illustrated in FIG. 3, the control element 40 acts directly on the pawls 38 which are also controlled by the control disc 37 of the centrifugal governor in a manner more fully described with reference to FIG. 1.

Figure 4:
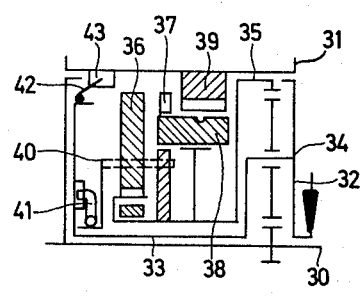

FIG. 4 shows a dual-speed hub in which a control element 40 coacts with the control disc 37 of the centrifugal governor. An axial pin on the control disc 37 extends within range of the cam face on the control element 40.

Figure 3:
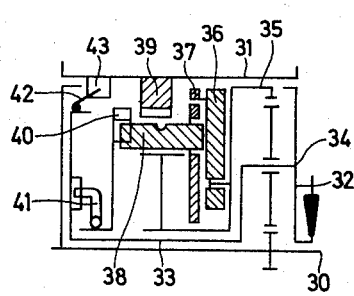

It is a common feature of the devices shown in FIGS. 2 to 4, that the two overrunning clutches are operatively interposed between the planetary gearing and the hub shell 31. They differ in the elements on which the centrifugal governor acts. In the dual-speed hubs shown in FIGS. 5 to 7, the centrifugal governor and the pedal-operated speed-switching device are axially interposed between the driver 32 and the planetary gearing. The pawls 42 are mounted directly on the driver 32 for engagement with a ratchet rim 43 on the hub shell 31. The centrifugal governor is mounted on the ring gear 35 for joint rotation at the higher speed of the ring gear.

Figure 5:
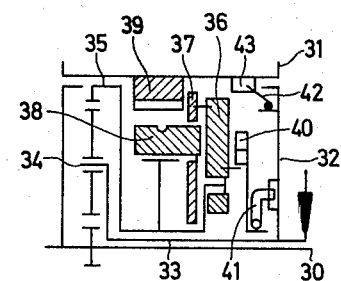
Figure 6:
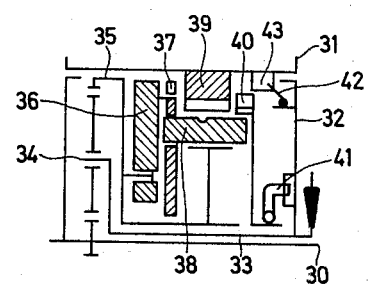
Figure 7:
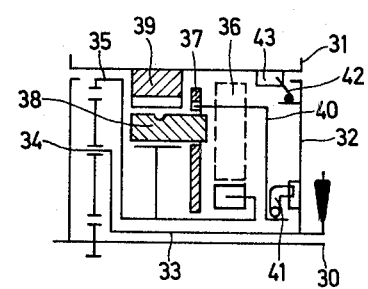

As is shown in FIG. 5, the control element 40 may act on the flyweights 36. In the embodiment illustrated in FIG. 6, the pedal operated control element 40 coacts with the pawls 38. The control element shown in FIG. 7 shifts a pin fixedly fastened to the control disc 37. The friction spring 41 in FIGS. 5 to 7 is attached to the driver 32.

Figure 8:
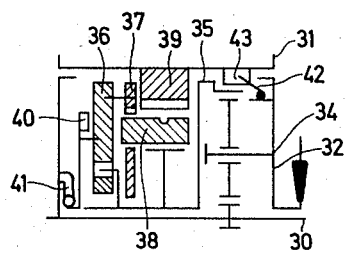
Figure 9:
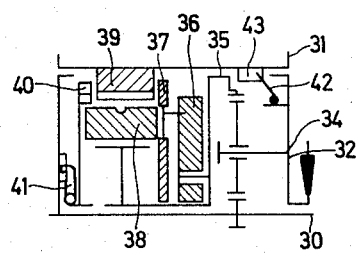
Figure 10:
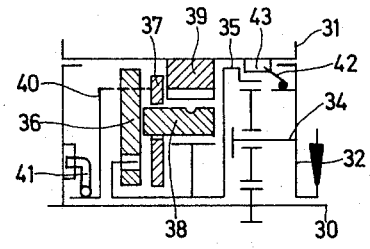

FIGS. 8 to 10 illustrate embodiments of the invention in which the pawls 42 of the overrunning clutch effective at low transmission ratio of the planetary gearing are operatively interposed between the driver 32 and the ratchet ring 43 on the hub shell 31, whereas the governor-controlled pawls 38 are mounted on the ring gear which also carries the flyweights 36. The pedal-operated control element 40 is rotatably mounted on the hub shaft 30, and the associated friction spring 41 is fastened to the inner bearing elements fixed on the shaft 30 which supports the axial end of the hub shell 31 remote from the driver 32. When the driver 32 is turned backward, the centrifugal governor is also turned backward by the planetary gearing. The control element 40 is turned relative to the ring gear 35 and the elements mounted thereon while the hub shell 31 continues turning forward or stands still.

In the devices illustrated in FIGS. 8 to 10, the control element 40 acts on the pawls 38 by way of the flyweights 36, directly, and by way of the control disc 37 respectively.

Figure 11:
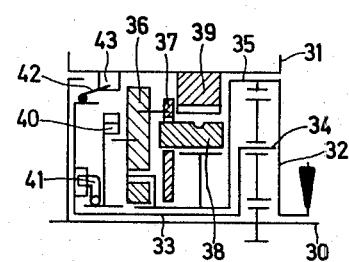
Figure 12:
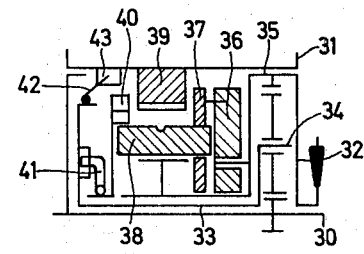
Figure 13:
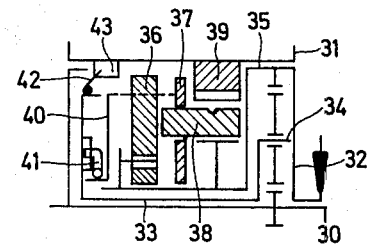

In the hubs shown in FIGS. 11 to 13, the hub shell 31 is turned by the planetary gearing at a lower speed than that of the driver 32, and the hub shell 31 rotates jointly with the driver in the high-speed condition of the hub. Both clutches are operatively interposed between the planetary gearing and the hub shell 31. The driver 32 is directly coupled to the ring gear 35 which carries the centrifugal governor and the pawls 38 controlled by the governor. The planet carrier 34 rotates at a lower speed than the ring gear 35 and is coupled with a drive sleeve 33 on which the pawls 42 are mounted in permanent contact with the gear rim 43 on the hub shell 31. The control element 40 is rotatably mounted on the sleeve 33 and its friction spring 41 is attached to the pawl-carrying part of the drive sleeve 33.

At a rotary speed too low for swinging the flyweights 36 away from the axis of the hub shaft 30 against the restraint of their return springs, torque is transmitted from the driver 32 to the hub shell 31 by way of the planet carrier 34, the drive sleeve 33, the pawls 42, and the ratchet rim 43. When the rotary speed of the hub increases, the centrifugal governor permits the pawls 38 to engage the ratchet teeth 39 on the hub shell 31 so that the shell turns at the speed of the driver 32 while the pawls 42 are overtraveled by the ratchet rim 43. The lower speed can be restored by brief back-pedaling in the manner described above.

The embodiments shown in FIGS. 11 to 13 differ from each other in the hub elements which coact directly with the control element 40. The element acts on the flyweights 36 in FIG. 11, on the pawls 38 in FIG. 12, and on the control disc 37 by way of an axial pin in FIG. 13.

Figure 14:
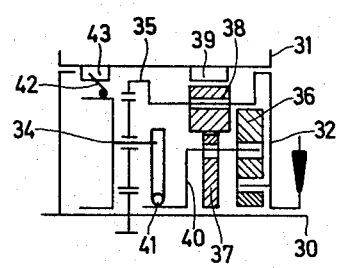
Figure 15:
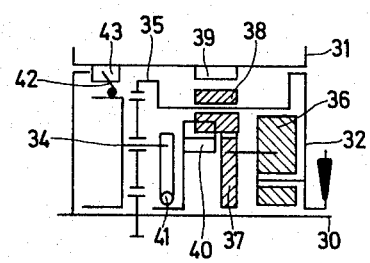
Figure 16:
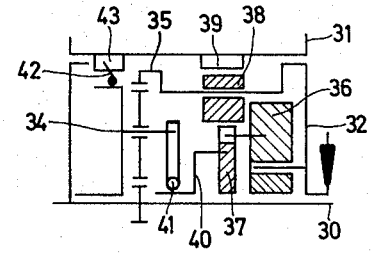

The hubs shown in FIGS. 14 to 16 are characterized by planetary gearing axially interposed between the pawls 38 and the pawls 42. The flyweights 36 of the centrifugal governor turn with the driver 32 as does the ring gear 35. The planet carrier 34 carries the pawls 42 which drive the hub shell 31 at the lower available speed. The control element 40 is rotatably mounted on the shaft 30 and connected by the friction spring 41 with the planet carrier 34.

FIG. 14 illustrates a hub in which the control element 40 acts on the flyweights 36 by means of coupling elements axially passing through openings in the control disc 37. In FIG. 15, the control element 40 acts directly on the pawls 38. The control disc 37 shown in FIG. 16 is connected to the control element 40.

What is claimed is:

1. A two-speed gear hub for bicycles and the like comprising:
    (a) a hub axle;
    (b) a hub sleeve rotatably mounted on said hub axle;
    (c) a planetary gear transmission in said hub sleeve including first and second transmission members operatively connected for simultaneous rotation about said axle at different speeds;
    (d) drive means for rotating said members in a forward direction and in a backward direction;
    (e) an overrunning clutch operatively interposed between said first transmission member and said hub sleeve for transmitting torque from said first member to said hub sleeve when said first member is rotated in said forward direction;
    (f) a pawl-and-ratchet clutch operatively interposed between said second transmission member and said hub sleeve and operable for transmitting torque from said second member to said hub sleeve when said second member is rotated in said forward direction;
    (g) a flyweight switch responsive to the rotary speed of one of said first and second transmission members for operating said pawl-and-ratchet clutch; and
    (h) control means responsive to backward rotation of said drive means and operating to be alternatingly switched between two operating positions for overriding said flyweight switch and for permitting engagement of said pawl-and-ratchet clutch in one of said operative positions and for preventing said engagement when in the other of said operative positions.

2. A hub as set forth in claim 1, wherein said second transmission member rotates at a higher speed than said first transmission member.

3. A hub as set forth in claim 1, wherein said pawl-and-ratchet clutch includes a pawl member mounted on said second transmission member and ratchet means on said hub sleeve, and said flyweight switch includes a flyweight mounted on said second transmission member for movement toward and away from said axle, a control disc connected to said flyweight switch for movement between two operative positions in response to said movement of the flyweight, said control disc permitting engagement of said pawl member with said ratchet means in one of said operative positions and preventing said engagement when in the other operative position.

4. A hub as set forth in claim 3, wherein said planetary gear transmission includes a sun gear on said axle, a ring gear and a planet carrier rotatable about said axle, and a planet gear on said planet carrier simultaneously meshing with said ring gear and said sun gear, said second transmission member being said ring gear.

5. A hub as set forth in claim 4, wherein said drive means include a drive member coaxially rotatable on said axle, said ring gear having a tubular portion rotatably mounted on said drive member and carrying said pawl member.

6. A hub as set forth in claim 3, wherein said control means include a control element mounted in said hub sleeve for angular movement relative to said pawl member between two angular positions, said control member in one of said angular positions thereof relative to said pawl member permits engagement of said pawl member with said ratchet means, and prevents said engagement in the other angular position thereof, means for rotating said control element at the rotary speed of said pawl member during the rotating of said transmission members in said forward direction, and friction means engaging said control element for moving said control element between said angular positions thereof in response to the rotating of said transmission members in said backward direction.

7. A hub as set forth in claim 6, wherein said control element prevents said movement of said flyweight in one of said angular positions thereof.

8. A hub as set forth in claim 6, wherein said control element is connected to said control disc for joint movement during said rotating of the transmission members in said backward direction.

9. A hub as set forth in claim 6, wherein said control element engages said pawl member during said rotating of the transmission members in said backward direction.

10. A hub as set forth in claim 6, wherein said drive means include a drive member coaxially rotatable on said axle, said control element being rotatably mounted on said drive member.

11. A hub as set forth in claim 1, wherein said planetary gear transmission includes a sun gear on said axle, one of said first and second transmission members being a ring gear, the other transmission member being a planet carrier, said ring gear and said planet carrier being mounted in said hub sleeve for rotation about said axle, said gear transmission further including a planet gear mounted on said planet carrier in simultaneous meshing engagement with said sun gear and said ring gear, said drive means including a driver member rotatably mounted on said axle.

12. A hub as set forth in claim 11, wherein said driver member is fixedly fastened to said ring gear.

13. A hub as set forth in claim 11, wherein said driver member is fixedly fastened to said planet carrier.

14. A hub as set forth in claim 13, wherein said overrunning and said pawl-and-ratchet clutches are axially interposed between said planetary gear transmission and said driver member.

15. A hub as set forth in claim 11, wherein said planetary gearing is axially interposed between said clutches and said driver member.

16. A hub as set forth in claim 11, wherein said overrunning clutch is axially interposed between said driver member and said planetary gear transmission, and said planetary gear transmission is axially interposed between said clutches.

17. A hub as set forth in claim 11, wherein said planet carrier is said first transmission member.

18. A hub as set forth in claim 1, wherein each of said clutches includes a pawl member mounted on one of said first and second transmission members, and a plurality of axially elongated ratchet teeth on said hub sleeve, each of said ratchet teeth being axially coextensive with each of said pawls.

* * * * *